(12) United States Patent
Dutertre

(10) Patent No.: US 12,382,875 B2
(45) Date of Patent: Aug. 12, 2025

(54) WORM CONVEYOR AND PRESS

(71) Applicant: DEERE & COMPANY, Moline, IL (US)

(72) Inventor: Matthieu Dutertre, Chemaudin (FR)

(73) Assignee: DEERE & COMPANY, Moline, IL (US)

( * ) Notice: Subject to any disclaimer, the term of this patent is extended or adjusted under 35 U.S.C. 154(b) by 822 days.

(21) Appl. No.: 17/654,663

(22) Filed: Mar. 14, 2022

(65) Prior Publication Data

US 2022/0361414 A1    Nov. 17, 2022

(30) Foreign Application Priority Data

May 11, 2021    (DE) .................... DE102021112210.4

(51) Int. Cl.
*A01F 15/07*    (2006.01)
*A01F 15/08*    (2006.01)
*A01F 15/18*    (2006.01)

(52) U.S. Cl.
CPC .......... *A01F 15/0833* (2013.01); *A01F 15/07* (2013.01); *A01F 15/08* (2013.01); *A01F 2015/077* (2013.01); *A01F 2015/186* (2013.01)

(58) Field of Classification Search
CPC ...... A01F 15/18; A01F 15/0833; A01F 15/07; A01F 15/08; A01F 2015/077; A01F 2015/078; A01F 2015/186
See application file for complete search history.

(56) References Cited

U.S. PATENT DOCUMENTS

| | | | |
|---|---|---|---|
| 3,232,419 A | | 2/1966 | Rasmussen |
| 3,888,345 A | * | 6/1975 | Mitchell ................ B65G 45/20 |
| | | | 198/494 |
| 4,428,282 A | * | 1/1984 | Anstey .................... A01F 15/07 |
| | | | 100/88 |
| 4,581,879 A | * | 4/1986 | Anstey .................... A01F 15/07 |
| | | | 100/88 |
| 4,890,449 A | * | 1/1990 | Hering .................... A01F 15/07 |
| | | | 56/341 |
| 5,097,760 A | * | 3/1992 | Ratzlaff ................ B30B 9/3003 |
| | | | 100/88 |

(Continued)

FOREIGN PATENT DOCUMENTS

| | | |
|---|---|---|
| CN | 202481702 U | 10/2012 |
| DE | 4019335 A1 | 12/1991 |

(Continued)

OTHER PUBLICATIONS

Extended European Search Report and Written Opinion issued in European Patent Application No. 22172211.9, dated Oct. 13, 2022, in 07 pages.

*Primary Examiner* — Adam J Behrens

(57) ABSTRACT

A worm conveyor is proposed for a press, in particular an agricultural baler, having at least one roll, screw flights winding in opposing directions at least in some regions around the roll being provided on the peripheral surface thereof for conveying material, wherein the screw flights are configured such that they bring together the material in two collecting regions arranged outside a central region of the worm conveyor. A press, in particular an agricultural baler having at least one roller, a flexible pressing means winding around the roller and at least one worm conveyor are also proposed.

13 Claims, 3 Drawing Sheets

(56) References Cited

U.S. PATENT DOCUMENTS

| | | | | |
|---|---|---|---|---|
| 5,224,329 | A * | 7/1993 | Viaud | B65G 45/20 |
| | | | | 100/88 |
| 5,261,323 | A * | 11/1993 | Gunther | A01F 15/07 |
| | | | | 100/88 |
| 6,044,556 | A * | 4/2000 | Petitfrere | A01F 15/07 |
| | | | | 29/895.211 |
| 6,786,143 | B2 | 9/2004 | Leupe et al. | |
| 8,037,814 | B1 * | 10/2011 | Smith | B30B 9/3082 |
| | | | | 100/88 |
| 8,056,314 | B1 * | 11/2011 | Anstey | A01F 15/106 |
| | | | | 56/364 |
| 9,510,511 | B2 * | 12/2016 | Goering | A01D 75/187 |
| 10,405,496 | B2 * | 9/2019 | Van Den Wildenberg | |
| | | | | A01F 15/10 |
| 11,134,614 | B2 * | 10/2021 | Eubanks | A01F 15/0715 |
| 11,166,413 | B2 * | 11/2021 | Beaufort | A01D 89/001 |
| 11,272,669 | B2 * | 3/2022 | Shonk | A01F 15/0833 |
| 11,700,793 | B2 * | 7/2023 | Tacke | A01F 15/101 |
| | | | | 100/142 |
| 2016/0286726 | A1 * | 10/2016 | Boone | A01D 89/002 |
| 2019/0350138 | A1 * | 11/2019 | Beaufort | A01F 15/12 |
| 2021/0084824 | A1 * | 3/2021 | Gahres | A01F 15/0833 |

FOREIGN PATENT DOCUMENTS

| | | | | |
|---|---|---|---|---|
| DE | 4113311 | A1 | 10/1992 | |
| DE | 19609926 | A1 * | 9/1997 | A01F 15/07 |
| EP | 0510499 | A1 | 10/1992 | |
| EP | 1591004 | | * 11/2005 | |
| EP | 1591004 | A1 * | 11/2005 | A01F 15/08 |
| FR | 2775157 | | * 8/1999 | |
| FR | 2775157 | A1 * | 8/1999 | A01F 15/07 |

* cited by examiner

WORM CONVEYOR AND PRESS

CROSS-REFERENCE TO RELATED APPLICATIONS

This application claims the benefit of German Patent Application DE102021112210.4, filed on May 11, 2021, the disclosure of which is hereby incorporated by reference.

TECHNICAL FIELD

The disclosure generally relates to a baler implement for forming cylindrical bales of a material, and more particularly to a worm conveyor of the baler implement.

BACKGROUND

A worm conveyor on a baler implement may be used, for example, on presses in order to convey material, in particular loose items. If a worm conveyor is used on an agricultural press, the loose items are generally harvested crops, for example in the form of hay, straw or silage. If the press is an industrial press, this may be used, for example, for pressing paper, cardboard, refuse or textiles.

Such worm conveyors generally extend over the width of a pressing chamber of the press and are configured as a roll, two screw flights conveying in opposing directions being arranged on the surface thereof. During operation of the press, the worm conveyor is set in rotation such that the screw flights entrain the loose items in order to move them into a predetermined region of the pressing chamber. In this case, this region is generally an edge region or a central region of the pressing chamber. Here the items or material are supplied, possibly again, to the material flow to be pressed. Thus, for example, DE-A1-4113311 discloses a worm conveyor which is provided in the immediate vicinity of a roll, removes the material collecting on the roll and supplies said material to a discharge point.

In known worm conveyors or in presses with such worm conveyors, it may arise that the material is not optimally conveyed, for example depending on the construction of the press or depending on the respective harvesting conditions. Additionally or alternatively, due to the collecting/conveyed material or due to a pressure exerted thereby on the pressing means, depending on the construction of the press it may lead to increased wear, for example in the form of abrasion and/or increased wear and tear, in particular of the pressing means.

SUMMARY

A worm conveyor for a press has at least one roll, screw flights winding in opposing directions at least in some regions around the roll being provided on the peripheral surface thereof for conveying material. The screw flights are configured such that they bring together the material in two collecting regions arranged outside a central region of the worm conveyor, whereby the conveyance of the material may be improved and thus an excessive loading of a pressing means in a central region of the worm conveyor and optionally increased wear and tear may be avoided. The press may be, in particular, an agricultural press, for example a press for forming round-cylindrical bales. The items to be pressed are, in particular, hay, straw or silage. However, it is also conceivable that the press is configured as an industrial press, as is used for example for forming bales consisting of refuse, paper or textiles.

It is particularly advantageous if two screw flights are provided, said screw flights preferably overlapping one another at least in some regions. In such an embodiment, the material collects in the regions in which the overlapping terminates. It is particularly advantageous if the screw flights overlap at least substantially in a central region of the roll. In this manner, in particular with an arrangement in opposing directions, the screw flights convey or distribute the material over the central region or across this central region and a collection of material in the central region is avoided.

It is particularly advantageous if the collecting regions are provided to be at least substantially adjacent to the central region. If in each case one of the screw flights terminates in one of the collecting regions, the screw flight conveys material entrained thereby into this collecting region, where it is brought together with material conveyed by the other screw flight.

A particularly simple construction and/or a particularly uniform conveyance of the material results if the worm conveyor and/or the screw flights is/are configured symmetrically, in particular symmetrically to a central axis of the worm conveyor which is preferably oriented perpendicular to a rotational axis of the worm conveyor.

It is advantageous if a press having at least one roller and a flexible pressing means winding around the at least one roller, has a previously described worm conveyor. In this manner, material which collects, for example on one side of the pressing means is brought together in two collecting regions and supplied therefrom to a material flow or a pressing process without it resulting in an overloading and/or increased wear of the press or the pressing means. The press is, in particular, an agricultural baler for forming round-cylindrical bales, in particular consisting of harvested crops, such as for example hay, straw or silage. Such a press may be towed by a different vehicle or may even be configured to be self-propelled. Alternatively, however, such a press may also be used in the industrial field, for example for forming bales made of paper, garbage, cloth or other materials.

If the press has a variable pressing chamber this may be formed, in particular in some regions, by the pressing means. In this case, the pressing means has an inner face facing the pressing chamber and an outer face remote from the pressing chamber. Preferably, the worm conveyor is arranged on the outer face of the pressing means such that said worm conveyor brings together items or material collecting at/on the outer face in the two collecting regions.

The pressing means may be configured in one piece. However, it is particularly advantageous if the pressing means has a plurality of, but in particular three, pressing belts, wherein preferably a gap is provided at least between two of the pressing belts. If at least one of these gaps at least substantially correlates with one of the collecting regions of the worm conveyor, items located in the collecting region may pass through the gap from one side of the pressing means to the other side thereof or to an intake of the press, from where said items may be preferably supplied to the pressing chamber or a pressing process.

If the worm conveyor is provided to be at least substantially adjacent to the one roller, said worm conveyor is able to interact therewith, for example such that it prevents an accumulation/adhesion of material/items on the roller or it entrains items adhering to the roller and/or removes said items therefrom. If the at least one roller or the worm conveyor is arranged above an intake into the pressing chamber, material/items conveyed by the worm conveyor and/or removed from the roller may pass via the intake into the pressing chamber and may be supplied to a pressing process.

It is conceivable that the worm conveyor protrudes into the pressing chamber only in some regions, for example only in an edge region. A particularly uniform conveyance results, however, if the worm conveyor extends at least substantially over the width of the pressing chamber. The worm conveyor and/or the roller may be provided to be movable in this case, or alternatively relative to the press per se or a frame of the press. It is particularly advantageous, however, if the worm conveyor or the roller and, in particular, both the worm conveyor and the roller is/are provided in a stationary manner.

Advantageously, the roller and/or the worm conveyor are provided to be drivable. It is particularly advantageous if the worm conveyor may be driven such that the material to be conveyed is conveyed by the screw flight in the direction of the central region. Alternatively, however, in suitable applications, a conveyance in the direction of the end regions of the worm conveyor is also conceivable.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
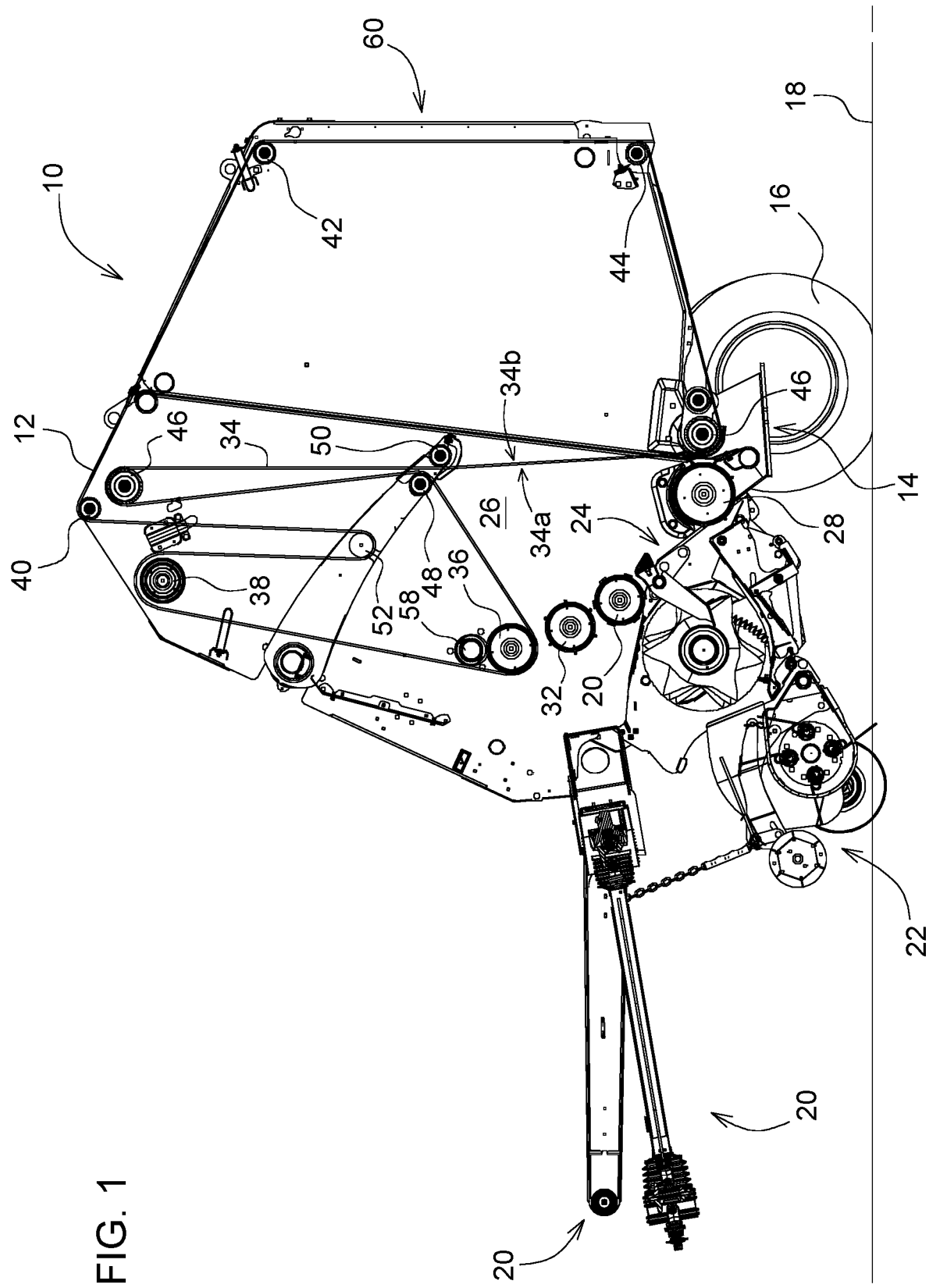
FIG. 1 is a schematic side view of a press with a plurality of rollers arranged in a housing, a pressing means winding around these rollers, and a worm conveyor.

Referring to the Figures, wherein like numerals indicate like parts throughout the several views, an embodiment of a press or baler implement is generally shown at 10 in FIG. 1. The press 10 has a frame 14 which bears a housing 12 and which is supported via a chassis 16 on the substrate 18. The press 10 shown is configured in the manner of a round baler and may be used both in the agricultural and in the industrial field for producing, in particular, a round-cylindrical bale which is generally denoted as a round bale, consisting of harvested crops, but also garbage, paper, cloth or woven fabric, cotton, tobacco, etc. Such a press 10 may be towed by a working vehicle, preferably in the form of a farm tractor, not shown, or may also be configured to be self-propelled.

According to the present exemplary embodiment, a drawbar 20 is provided on the front side of the frame 14 in order to hitch the press 10 to a farm tractor, not shown, and to be able to tow said press over a field. A receiving device 22 in the form of a pick-up serves for receiving harvested crops lying on the substrate 18, for example hay or straw deposited in a swath. The harvested crops received by the receiving device 22 are supplied via an intake 24 to a pressing chamber 26 and rolled up therein in a spiral-shaped manner to form a round-cylindrical bale, bound and then deposited on the substrate 18.

Figure 2:
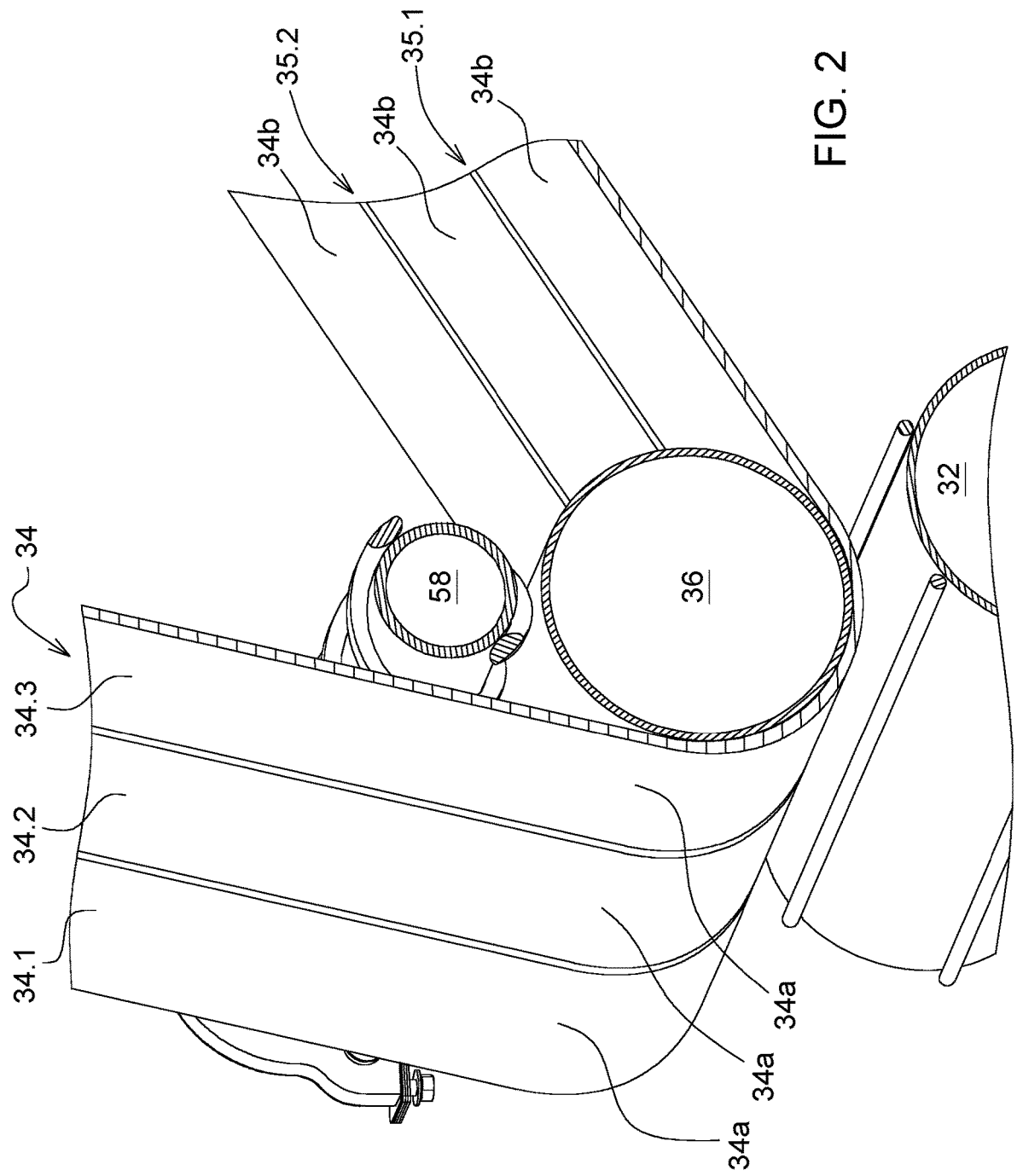
FIG. 2 is an enlarged schematic three-dimensional view of the worm conveyor, an adjacent roller, and the pressing means winding around this worm conveyor.

A lower stationary roll 28 and two upper rolls 30, 32 are positioned at the intake 24 of the pressing chamber 26. The pressing chamber 26 is also formed by an endless pressing means 34 which according to the present embodiment is designed in the form of three pressing belts 34.1, 34.2, 34.3 located adjacent to one another (see FIG. 2) and is guided around a fixed roller 36 and a plurality of fixed and movable rollers 38, 40, 42, 44, 46, 48, 50, 52, 54, 56. The pressing means 34 has an inner face 34a facing the pressing chamber 26 and an outer face 34b. In each case two pressing belts 34.1, 34.2, 34.3 define a gap 35.1, 35.2 therebetween. For example, pressing belts 34.1 and 34.2 define gap 35.2 therebetween, and pressing belts 34.2 and 34.3 define gap 35.1 A worm conveyor 58 is provided adjacent to the fixed roller 36 on the outer face 34b of the pressing means 34, further details thereof being provided hereinafter.

Whilst the pressing chamber 26 is substantially surrounded on the peripheral side by the pressing means 34 and the rolls 28, 30 and 32, it is laterally defined by side walls, not shown.

The pressing means 34 adopts an initial state in which it bridges the intake 24 by being stretched out in a straight line, and an end state in which it is wound around a bale, not shown, in the manner of a large loop. The pressing chamber 26 is thus variable in terms of its size, i.e. its diameter increases with the size of the bale. During its formation the bale is located in the pressing chamber 26 and to a large extent is wound around by the pressing means 34, but drops out of the pressing chamber 26 to the rear onto the substrate 18 as soon as the bale formation process is complete and an ejection flap 60 of the baler 10 which is pivotable counter-clockwise is opened.

Figure 3:
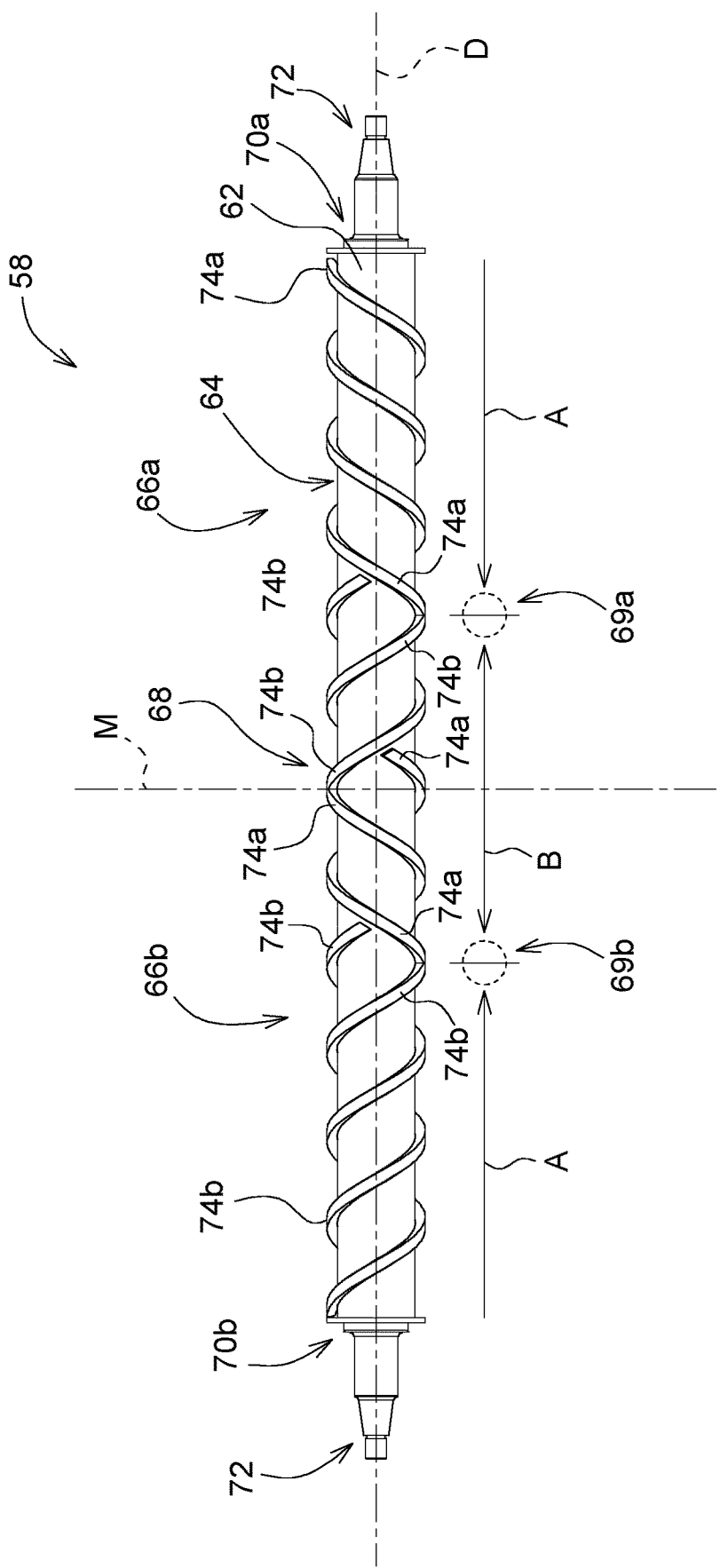
FIG. 3 is a schematic front plan view of the worm conveyor.

Reference is now also made to FIG. 3 of the drawing, in which the worm conveyor 58, which is provided adjacent to the roller 36 outside the pressing chamber 26 defined by the pressing means 34, is shown in more detail. According to the embodiment shown, the worm conveyor 58 has a cylindrical hollow body or a roll 62 with a peripheral surface 64, a first and a second edge region 66a, 66b, a central region 68 and a first and a second front face 70a, 70b. End regions 72 adjoin the first and second front faces 70a, 70b of the roll 62, said end regions 72 being configured such that they are able to be rotatably received in bearings, not shown, on the frame 14 of the baler 10. During operation, the worm conveyor 58 may also be set in rotation about a central longitudinal axis D by means of a drive, not shown.

A first and a second screw flight 74a, 74b are provided on the peripheral surface 64 of the roll 62, said first and second screw flights 74a, 74b being wound around the roll 62 starting from the first and second front faces 70a, 70b in the direction of the central region 68. In this case, the screw flights 74a, 74b are wound around the roll 62 in a spiral manner in opposing rotational directions. When viewed from the first front face 70a the first screw flight 74a is wound around the roll 62 in a counterclockwise rotational direction as the first screw flight 74a spirals away from the first front face 70a, and the second screw flight 74b is wound around the roll 62 in a clockwise rotational direction as the second screw flight 74b spirals away from the first front face 70a. When viewed from the second front face 70b the first screw flight 74a is wound around the roll 62 in a counterclockwise rotational direction as the first screw flight 74a spirals away from the second front face 70b, and the second screw flight 74b is wound around the roll 62 in a clockwise rotational direction as the second screw flight 74b spirals away from the second front face 70b. Both the first and second screw flights 74a, 74b extend across the central transverse axis M of the roll 62, so that they overlap across at least a portion of the central region 68 and in each case terminate or run into a first and a second collecting region 69a, 69b adjoining the central region 68. The central transverse axis M is located at a longitudinal center of the roll 62, substantially midway between the first front face 70a and the second front face 70b, measured along the central longitudinal axis D of the roll 62.

These first and second collecting regions 69a, 69b are arranged such that they correlate with gaps 35.1, 35.2 between the individual pressing belts 34.1, 34.2, 34.3.

During operation, the worm conveyor 58 is set in rotation by the drive, not shown, such that material located on the outer face 34b outside the pressing chamber 26 is conveyed by the screw flights 74a, 74b in the direction of the central region 68 of the worm conveyor 58. This is illustrated in FIG. 3 of the drawing by the arrows A pointing from the first and second front faces 70a, 70b toward the central region 68 of the worm conveyor 58.

Items collecting in the central region 68 are conveyed by the overlapping arrangement of the screw flights 74a, 74b in the central region 68 in the direction of the first and second front faces 70a, 70b, as indicated by the arrows B.

By the opposing conveying directions of the screw flights 74a, 74b the material is brought together in the first and second collecting regions 69a, 69b. Since the first and second collecting regions 69a, 69b are arranged such that they correlate with the gaps 35.1, 35.2 between the pressing belts 34.1, 34.2, 34.3, the material brought together in the first and second collecting regions 69a, 69b and collecting therein is able to pass through the gaps 35.1, 35.2 in order to return into the intake 24 of the press 10. The material then passes into the pressing chamber 26 via the intake 24 and is supplied to the actual pressing process.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement for forming a material into a bale having a cylindrical shape, the baler implement comprising:
   a plurality of rollers;
   a plurality of belts wound around the plurality of rollers to form a pressing chamber, the plurality of belts having an inner face configured for contacting the bale and forming a baling chamber during rotation about the plurality of rollers, and an outer face disposed opposite of the inner face and remote from the pressing chamber, such that the outer face does not contact the bale during rotation about the plurality of rollers;
   a worm conveyor disposed against the outer face of the plurality of belts for engaging crop material located on the outer face of the plurality of belts outside of the pressing chamber, the worm conveyor including:
   a roll having a peripheral surface and extending along a central longitudinal axis between a first front face and a second front face;
   wherein the roll includes a first edge region, a second edge region, and a central region disposed between the first edge region and the second edge region along the central longitudinal axis;
   wherein the first edge region and the central region join at a first collecting region, and the second edge region and the central region join at a second collecting region, whereby the central region is disposed between the first collecting region and the second collecting region; and
   a first screw flight and a second screw flight provided on the peripheral surface of the roll, wherein the first screw flight and the second screw flight wind in a spiral manner in opposing rotational directions about the central longitudinal axis and positioned such that the first screw flight moves crop material in the central region toward the second collecting region and the second screw flight moves crop material in the central region toward the first collecting region.

2. The baler implement set forth in claim 1, wherein the second screw flight is arranged in the second edge region to move crop material in the second edge region toward the second collecting region.

3. The baler implement set forth in claim 1, wherein the first screw flight is arranged in the first edge region to move crop material in the first edge region toward the first collecting region.

4. The baler implement set forth in claim 1, wherein the first screw flight and the second screw flight overlap at an approximate midpoint of the central region along the central longitudinal axis.

5. The baler implement set forth in claim 1, wherein the first screw flight and the second screw flight overlap at the first collecting region.

6. The baler implement set forth in claim 1, wherein the first screw flight and the second screw flight overlap at the second collecting region.

7. The baler implement set forth in claim 1, wherein the plurality of belts define a gap therebetween, with one of the first colleting region or the second collecting region aligned with the gap along the central longitudinal axis.

8. The baler implement set forth in claim 7, wherein the plurality of belts are arranged about the plurality of rollers to define an inlet into the pressing chamber, with the worm conveyor positioned substantially above the inlet, such that crop material passing through the gap falls into the inlet.

9. The baler implement set forth in claim 1, wherein the worm conveyor extends along the central longitudinal axis of the roll across a width of the pressing chamber.

10. A baler implement comprising:
    a press having at least one roller;
    a flexible pressing means winding around the at least one roller and forming a pressing chamber;
    wherein the flexible pressing means has an inner face configured for contacting a bale and facing the pressing chamber during rotation about the at least one roller, and an outer face disposed opposite of the inner face and remote from the pressing chamber, such that the outer face does not contact the bale during rotation about the at least one roller;
    a worm conveyor arranged on the outer face of the flexible pressing means, wherein the worm conveyor includes at least one roll, screw flights winding in opposing directions at least in some regions around the roll being provided on the peripheral surface thereof for conveying material disposed on the outer face of the flexible pressing means, wherein the screw flights are configured such that they bring together the material in two collecting regions arranged outside a central region of the worm conveyor.

11. The baler implement set forth in claim 10, wherein two screw flights are provided, the screw flights preferably overlapping one another in at least the central region.

12. The baler implement set forth in claim 10, wherein the collecting regions are provided to be at least substantially adjacent to the central region, wherein in each case one of the screw flights terminates in one of the collecting regions.

13. The baler implement set forth in claim 10, wherein the collecting regions are configured symmetrically to a central axis of the worm conveyor, wherein the central axis is oriented perpendicular to a rotational axis of the worm conveyor.

\* \* \* \* \*